Oct. 14, 1958  C. E. MILLER  2,855,815
STOCK REEL AND INDEXING MECHANISM THEREFOR
Filed Oct. 4, 1955  4 Sheets-Sheet 1
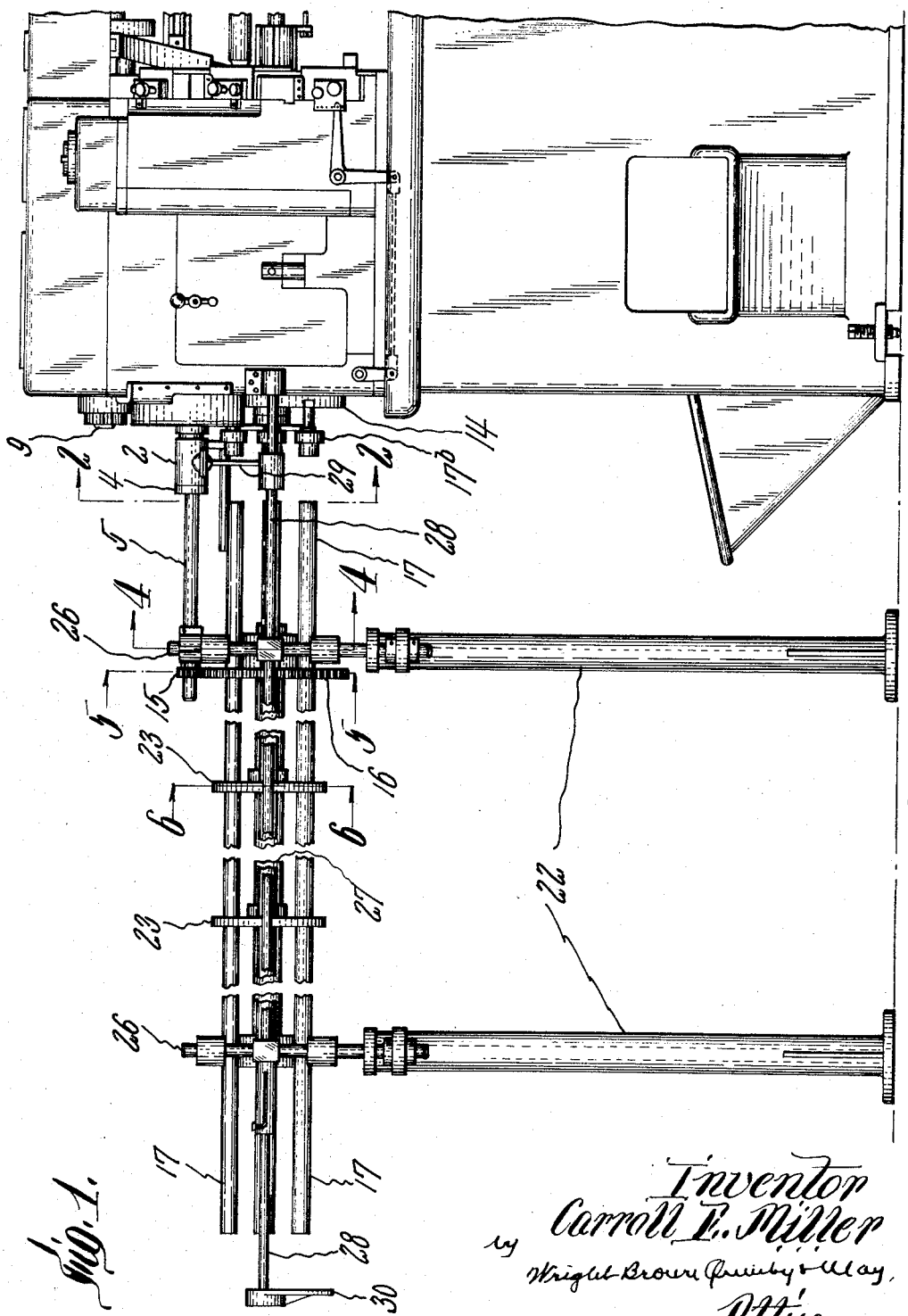

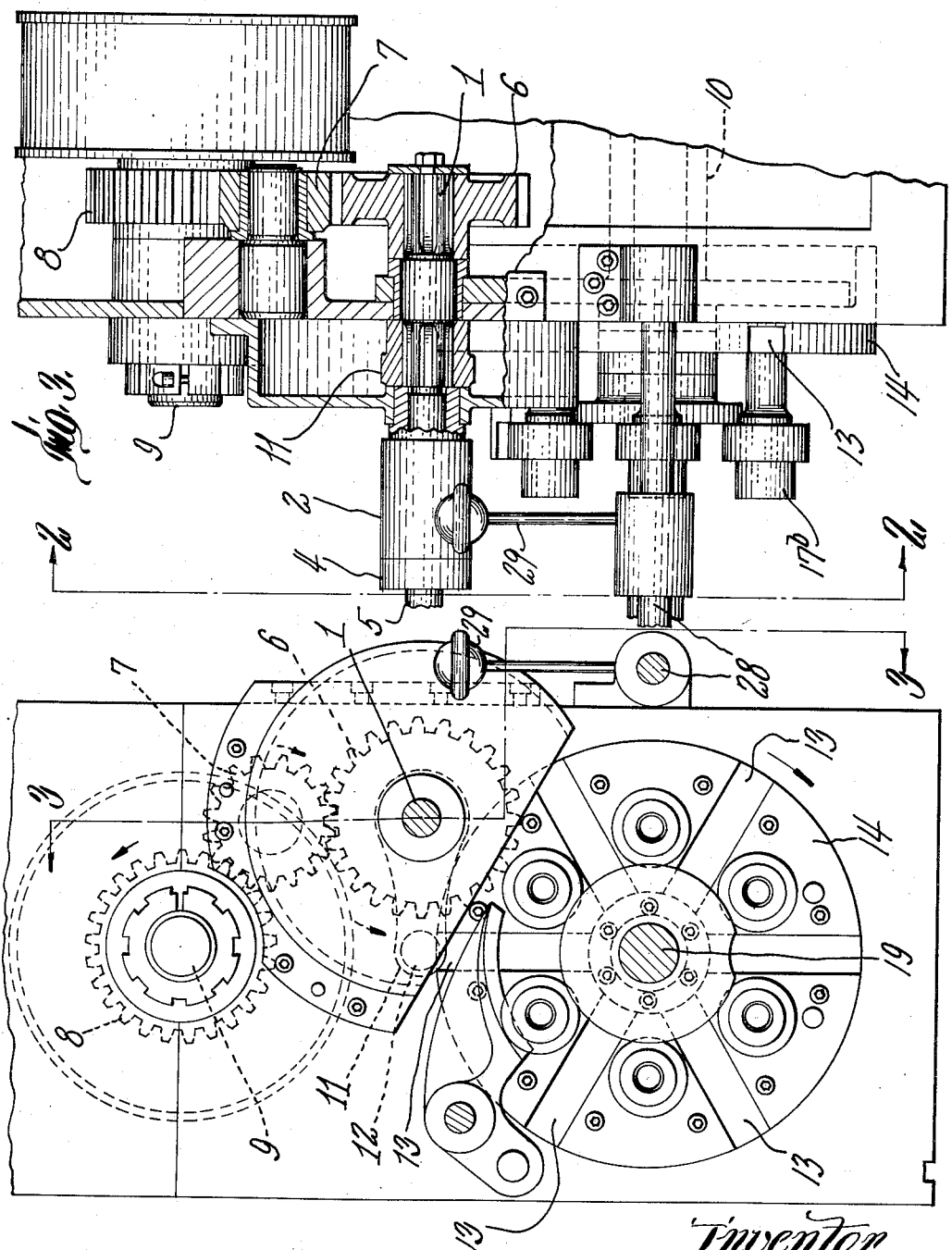

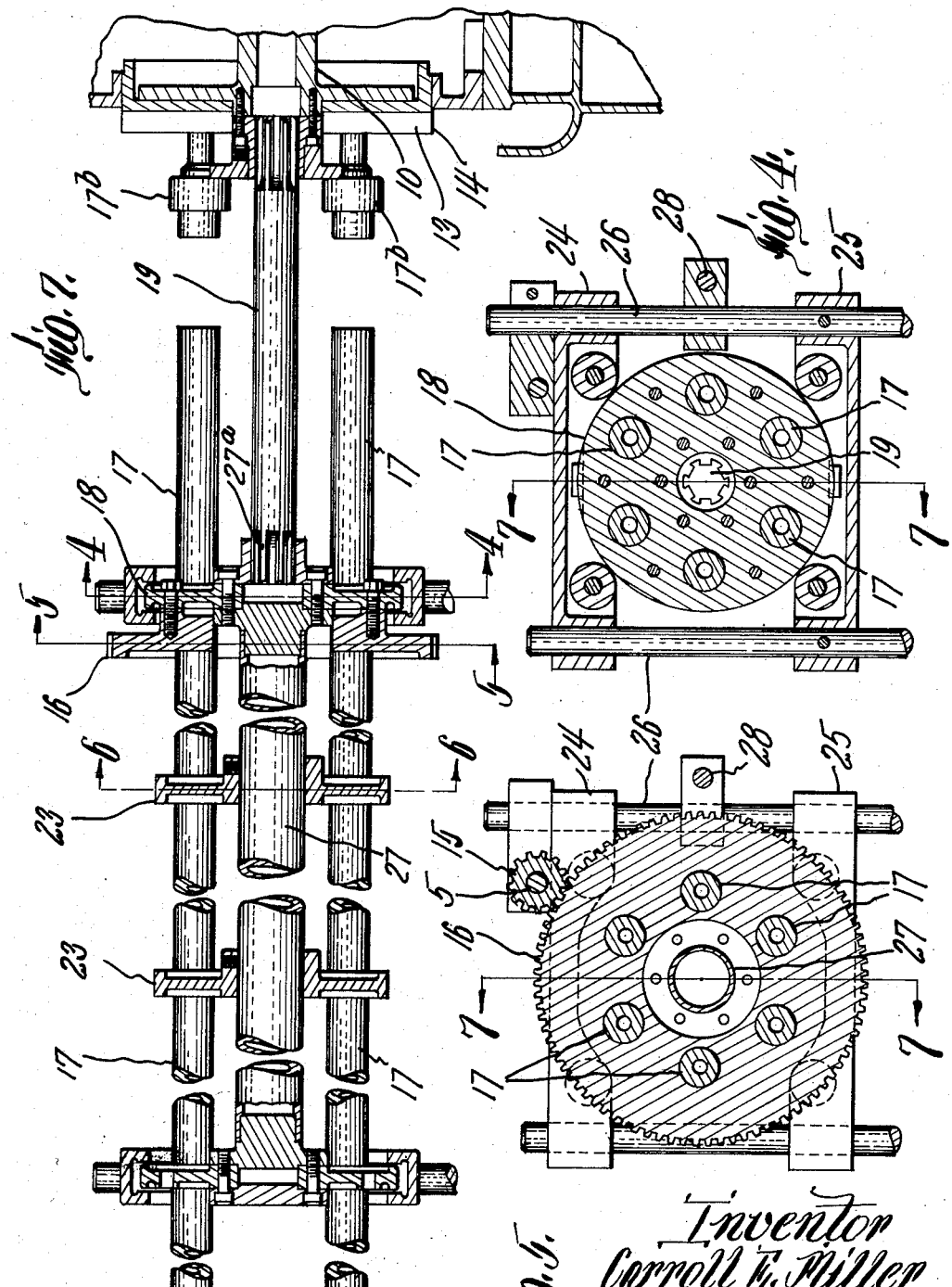

Oct. 14, 1958 C. E. MILLER 2,855,815
STOCK REEL AND INDEXING MECHANISM THEREFOR
Filed Oct. 4, 1955 4 Sheets-Sheet 4
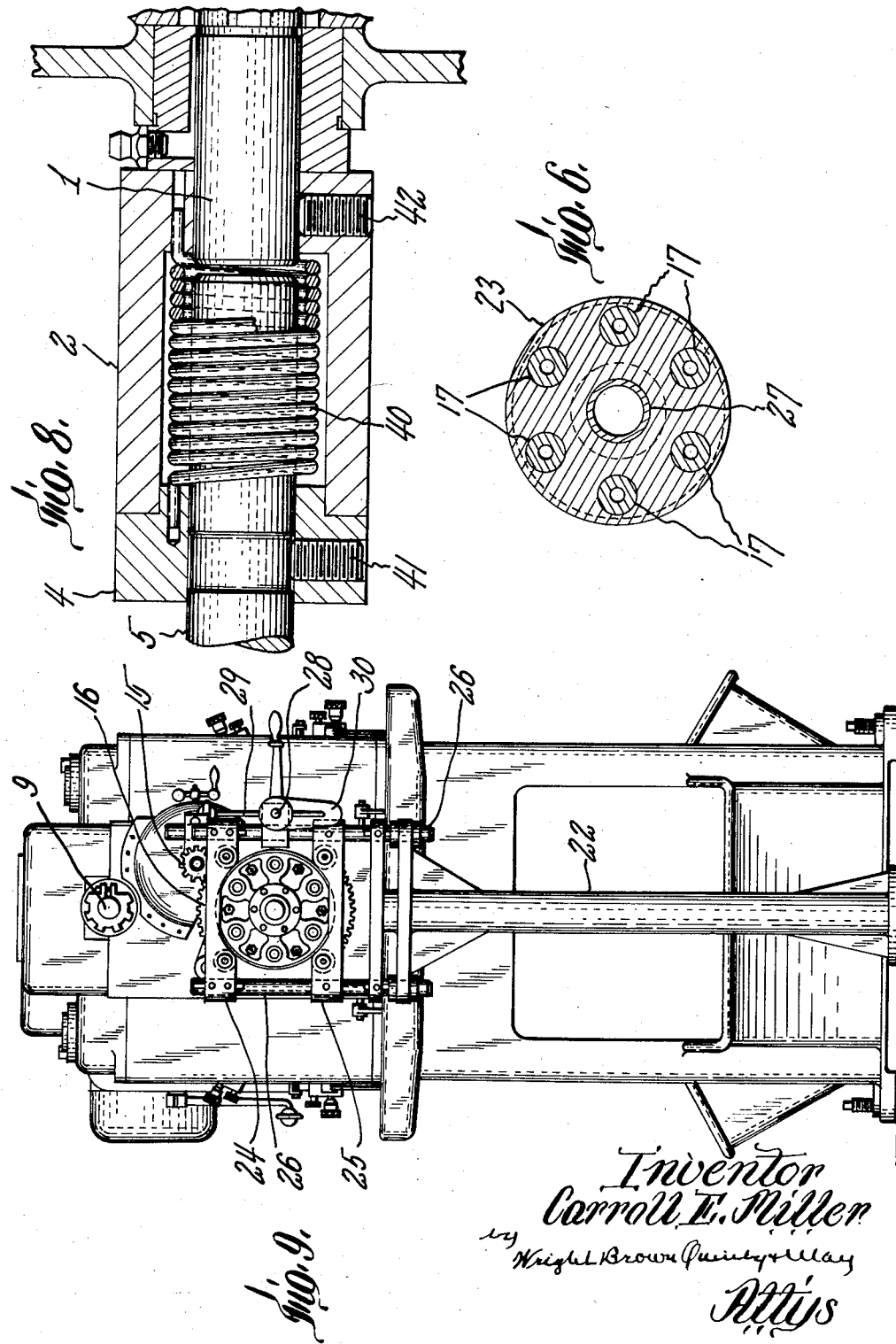
Inventor
Carroll E. Miller

# United States Patent Office 2,855,815
Patented Oct. 14, 1958

2,855,815

STOCK REEL AND INDEXING MECHANISM THEREFOR

Carroll E. Miller, Windsor, Vt., assignor to Cone Automatic Machine Company, Inc., Windsor, Vt., a corporation of Vermont Application October 4, 1955, Serial No. 538,370

2 Claims. (Cl. 82—38)

In multiple spindle lathes it is common practice to arrange the spindles in a carrier in circular array about the carrier axis and to index the carrier angularly to bring the spindles successively into the various tooling positions. In connection with such machines it is usual practice to associate with the indexable carrier a stock reel in which the stock for the several spindles is held in alinement with the spindles, the reel being indexed with the carrier and the stock fed therefrom into tooling relation to the respective spindles.

It is also usual practice to connect the carrier and reel by a shaft coaxial therewith and to transmit the turning torque during indexing for the carrier and reel entirely through this shaft. When the indexing is being done at high speed, this arrangement places a very heavy load on the indexing means and on the coaxial shaft due to the inertia of the reel assembly with its load of stock to such an extent such that the coaxial shift will be momentarily twisted so that the reel will lag.

In accordance with this invention a turning force exerted by a "booster" in addition to that provided by merely turning the central shaft is provided for the indexing action, thus to relieve the central shaft from at least some of the torque, and eliminate deflection which might otherwise be caused therein due to inertia of the parts.

This additional turning force is applied, in accordance with this invention, to the stock reel adjacent to its periphery so as to be effective thereon through a longer lever arm than the force exerted through the central shaft.

A further advantage of this invention arises by reason of the fact that the additional turning force is applied by a spring which is wound to store up energy during the machining portion of the machine cycle and is released at the proper time and so applied as to aid the indexing action. by taking a portion of the load from the coaxial shaft during the short time in which the indexing action occurs. The winding of the spring then effects lengthening of the time during which indexing force is exerted by the machine drive, so as to spread the period during which indexing load is imposed thereon and to relieve the mechanism from sudden stresses occasioned by imposing the entire indexing load on the central shaft during the short time during which the indexing action occurs.

For a complete understanding of this invention reference may be had to the accompanying drawings in which:

Figure 1 is a front elevation of a stock reel and the adjacent portion of a multiple spindle lathe embodying the invention.

Figure 2 is a sectional view to a larger scale on line 2—2 of Figure 1.

Figure 3 is a view partly in front elevation and partly broken away and in section along the line 3—3 of Figure 2.

Figures 4, 5 and 6 are lateral sectional views on the correspondingly numbered section lines of Figures 1 and 7.

Figure 7 is a longitudinal sectional view on line 7—7 of Figures 4 and 5.

Figure 8 is a fragmentary longitudinal sectional view of the stock reel booster mechanism and reel, to a larger scale.

Figure 9 is a left end elevation of the machine and stock reel.

Referring first to Figures 2 and 3, an indexing shaft is shown at 1 carrying an indexing arm 11 provided with a follower roll 12 which cooperates during a portion of the angular motion of the shaft 1 with suitable ways 13 in an indexing disk 14 carried by an indexing spindle carrier such, for example, as is described and illustrated in U. S. Patent No. 2,236,440. The disk 14 is secured to the flanged end portion of the carrier shaft 10 (Figure 7). This carrier is indexed about a central axis, as is well understood in the art, and carries a plurality of work spindles arranged in circular array about this axis.

The flanged spindle carrier shaft 10 is suitably connected as by the splined connections at 27a through a shaft 19 to a tube 27 which is in substantial alinement therewith and which forms the coaxial member of a stock reel having a plurality of tubes 17 arranged in circular array and in substantial alinement with the several work spindles of the carrier. The stock to be operated upon in the spindles is fed through the tubes 17 into the rear end of each of the spindles as through a feed tube 17b which may be of usual construction. The tubes 17 are secured to the spaced supporting disks 18, there also being guide disks 23 between the two tubular columns 22 and the upper and lower roll supports 24 and 25 adjustably supported on the guide rods 26. The stock reel as a unit is tied by the stock reel tube 27 and shaft 19 and secured to the center shaft 19 and to the indexing plate unit comprising the indexing plate 14.

Located on the front side and running the full length of the stock reel is a rod 28 which is used to aid the operator when loading a bar of stock. The stock is placed into the stock tube at the loading station with a portion of the stock protruding at the rear. The work clamping means, with which each work spindle is provided, is then open at this particular station. The rod 28 has a handle 29 positioned to be grasped by the operator and by which the rod may be turned to bring the member 30 into alinement with the stock and to press the stock through the spindle and against the stock stop which is in full view of the operator. This allows the operator to feed the stock to the exact extent desired for the starting of a cycle of operations.

The indexing shaft 1 is connected through a train of gears 6, 7, and 8 shown in Figures 2 and 3 to a shaft 9, this shaft 9 which is the main cam shaft of the machine is of the type shown in Patent No. 2,236,440. The indexing action takes place during a portion of each revolution of the shaft 1 while the follower roll 12 is engaged in one of the ways 13. There is a suitable device (not shown) but common in the art for locking the carrier in indexed position between the indexing actions produced by the rotation of the shaft 10, a device of this kind being shown in said patent. It will be noted that the shaft 1 is well spaced from the axis of the spindle carrier and the reel and in alinement therewith is positioned a shaft 5 which is secured to a member 4 by the screw 41. The shaft 5 and the shaft 1 are connected together as by means of a torsion spring 40 (Figure 8) through the member 2 which is rotatably journaled at one end to the member 4 and the other end is secured to the shaft 1 as by the screw 42. When the indexing shaft 1 is being turned, but while the spindle carrier is locked, this spring 40 is being wound.

As soon as the spindle carrier is unlocked, which is just before the indexing action when the follower 12 first engages in the way 13 of the indexing disk, this spring 40 acts to rotate the shaft 5 which is connected through a pinion 15 thereon with a gear 16 which carries the tubes 17 at one end of the reel as shown in Figure 1. Thus when the indexing shaft turns prior to an indexing action and while the stock reel and spindle carrier are in locked position, the spring 40 is wound so that as soon as the spindle carrier and stock reel are released, a turning effort is exerted by the spring 40 direct to the stock reel at a position considerably spaced from its central axis as is shown in Figure 5. Thus a turning force is exerted directly on the stock reel independent of that produced by rotation of the central shaft 10 and its connection to the central shaft 27 on the stock reel. Thus a turning force in addition to that exerted by the turning of the axial shafts 10, 19, and 27 is exerted, thus relieving the central shaft from the entire load of turning the stock reel. This permits rapid indexing of the carrier and stock reel without interposing torsion stresses on the central shaft connecting them such as would tend to delay the indexing of the stock reel with the carrier.

From the foregoing description of an embodiment of this invention it should be evident to those skilled in the art that various changes and modifications may be made therein without departing from its spirit or scope.

I claim:

1. In combination with a multiple spindle lathe having an indexing disk for a spindle carrier, an indexing stock reel, connections between said reel and disk ensuring simultaneous indexing thereof, means connected thereto for indexing said disk, means actuated by said lathe when said disk is stationary between indexing for storing energy, and means for receiving energy from said storing means and applying it to said stock reel to index said stock reel while said disk is being indexed.

2. In combination with a multiple spindle lathe having an indexing disk for a spindle carrier, an indexing stock reel, connections between said reel and disk ensuring simultaneous indexing thereof, means connected thereto for indexing said disk, means actuated by said lathe when said disk is stationary between indexing for storing energy, and means spaced outward from the axis of said stock reel for receiving energy from said storing means and applying it spaced outwardly from the axis of said stock reel to said stock reel to index said stock reel while said disk is being indexed.

References Cited in the file of this patent

UNITED STATES PATENTS

| | | |
|---|---|---|
| 1,834,338 | Dale | Dec. 1, 1931 |
| 1,979,146 | Davey | Oct. 30, 1934 |
| 2,178,114 | Eckardt | Oct. 31, 1939 |
| 2,328,733 | Mansfield | Sept. 7, 1943 |
| 2,417,605 | Miller | Mar. 18, 1947 |
| 2,742,656 | Fischer | Apr. 24, 1956 |